United States Patent [19]

Blackwood-Murray et al.

[11] 4,440,295

[45] Apr. 3, 1984

[54] IDLER ROLLER

[75] Inventors: Thomas J. Blackwood-Murray, Sandton; David Evans, Kempton Park, both of South Africa

[73] Assignee: Aerofoam Industries (Proprietary) Limited, Boksburg North, South Africa

[21] Appl. No.: 203,079

[22] Filed: Oct. 31, 1980

[30] Foreign Application Priority Data

Nov. 1, 1979 [ZA] South Africa ............... 79/5863
Nov. 1, 1979 [ZA] South Africa ............... 79/5864

[51] Int. Cl.³ .............................................. B65G 39/10
[52] U.S. Cl. ........................................ 198/843; 29/132
[58] Field of Search ............... 198/780, 842, 830, 835, 198/843; 193/37; 29/129.5, 130, 132; 164/111

[56] References Cited

U.S. PATENT DOCUMENTS

| | | | |
|---|---|---|---|
| 3,622,059 | 11/1971 | Savela | 29/132 |
| 3,711,912 | 1/1973 | Teske | 198/835 |
| 3,923,150 | 12/1925 | Jager | 198/787 |
| 3,941,635 | 3/1976 | Tavelle et al. | 29/130 |
| 4,299,022 | 11/1981 | Kummerl | 29/132 |
| 4,312,444 | 1/1982 | Mushovic | 198/780 |
| 4,344,218 | 8/1982 | Hooper et al. | 198/842 |

FOREIGN PATENT DOCUMENTS 772048 4/1957 United Kingdom ............... 198/842

*Primary Examiner*—Joseph E. Valenza
*Assistant Examiner*—Jonathan D. Holmes
*Attorney, Agent, or Firm*—Sughrue, Mion, Zinn, Macpeak and Seas

[57] ABSTRACT

An idler roller particularly for conveyor belt support and comprises a prefabricated core member about which is moulded an abrasion and impact resistant load bearing synthetic plastic shell. The shell includes a tubular load bearing wall and integral side walls for the accommodation of bearings which receive the idler shaft. By the utilization of a relatively inexpensive core which does not require to possess load bearing properties, and utilizing this core as a former about which the load bearing shell is moulded, a satisfactory idler roller structure can be constructed relatively inexpensively. The shell should be moulded from a non-foamed polyurethane elastomer material to give high quality abrasion resistance coupled with impact resistance.

10 Claims, 7 Drawing Figures

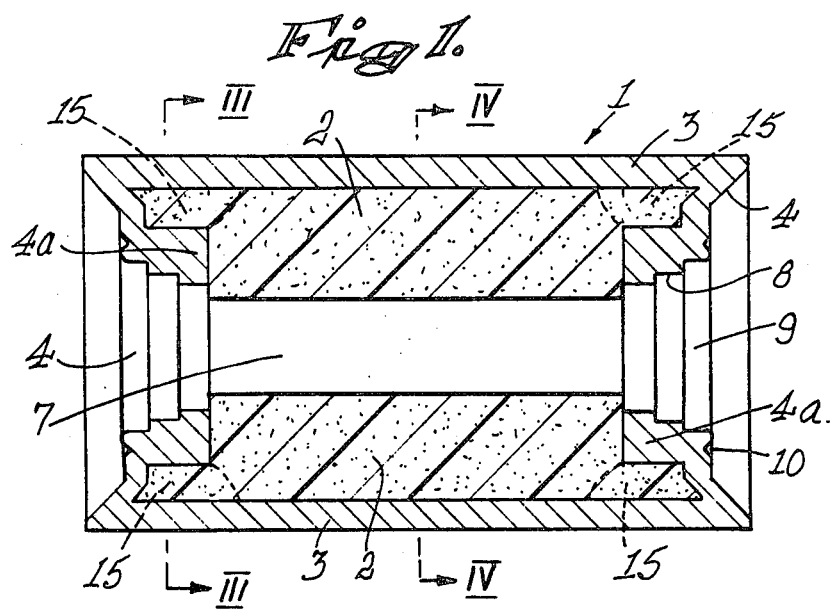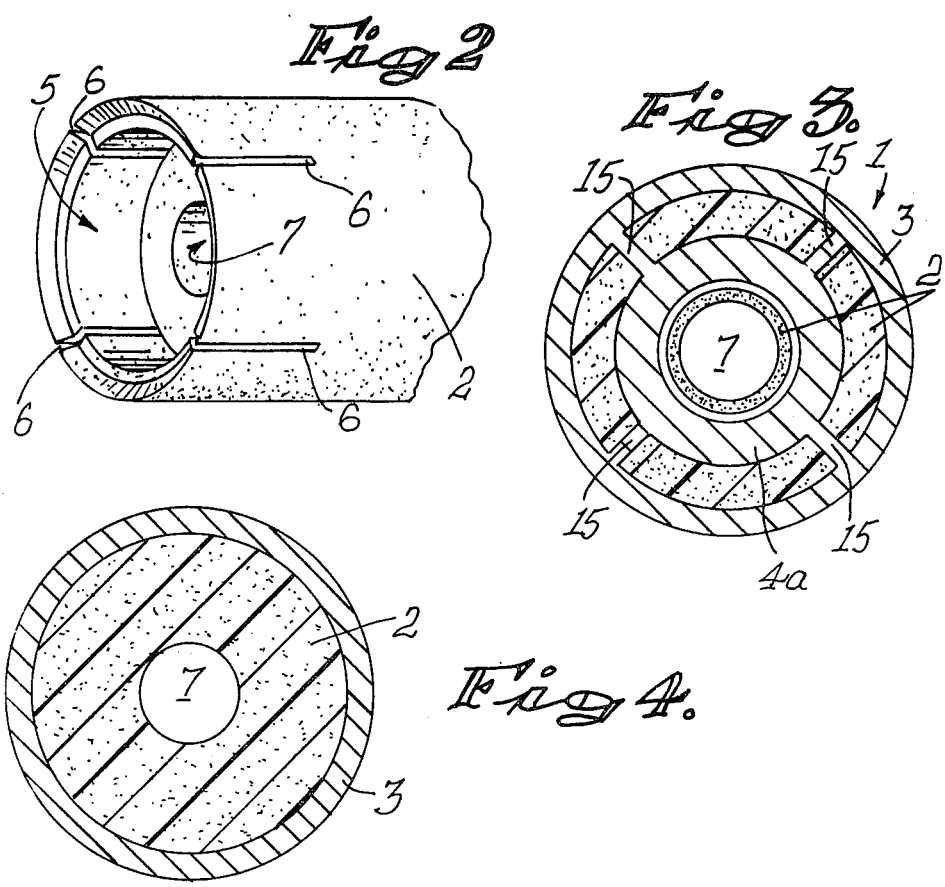

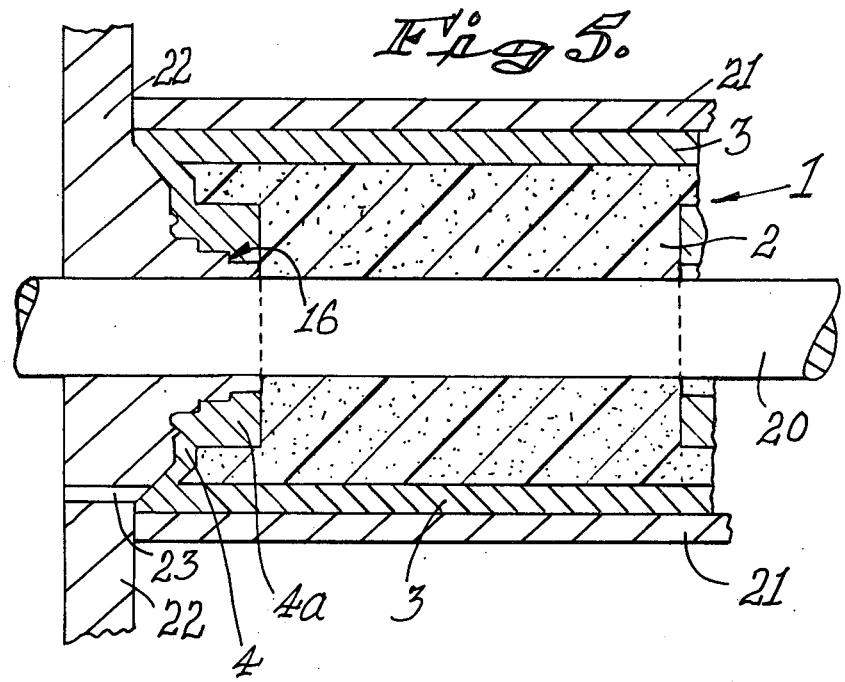
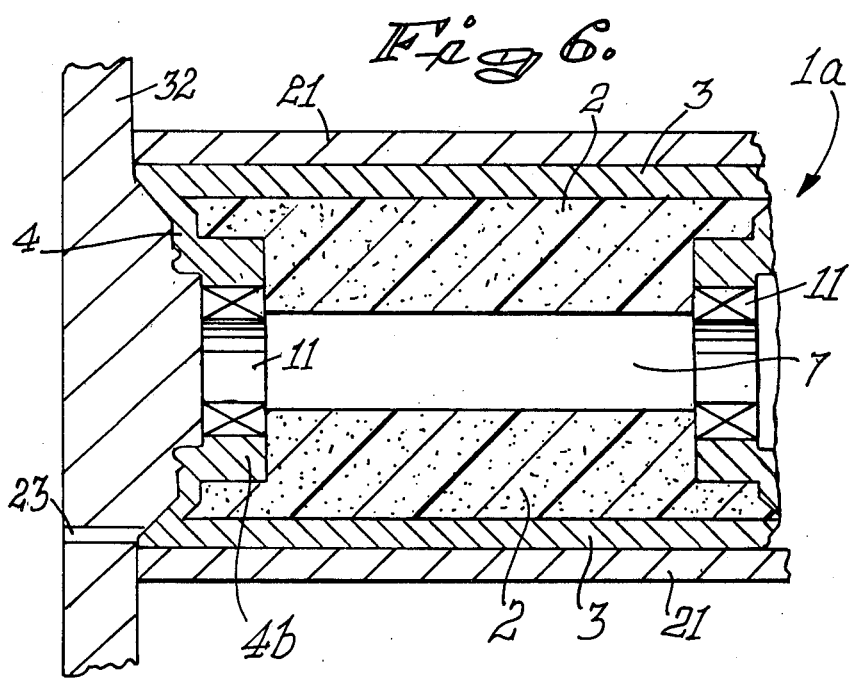

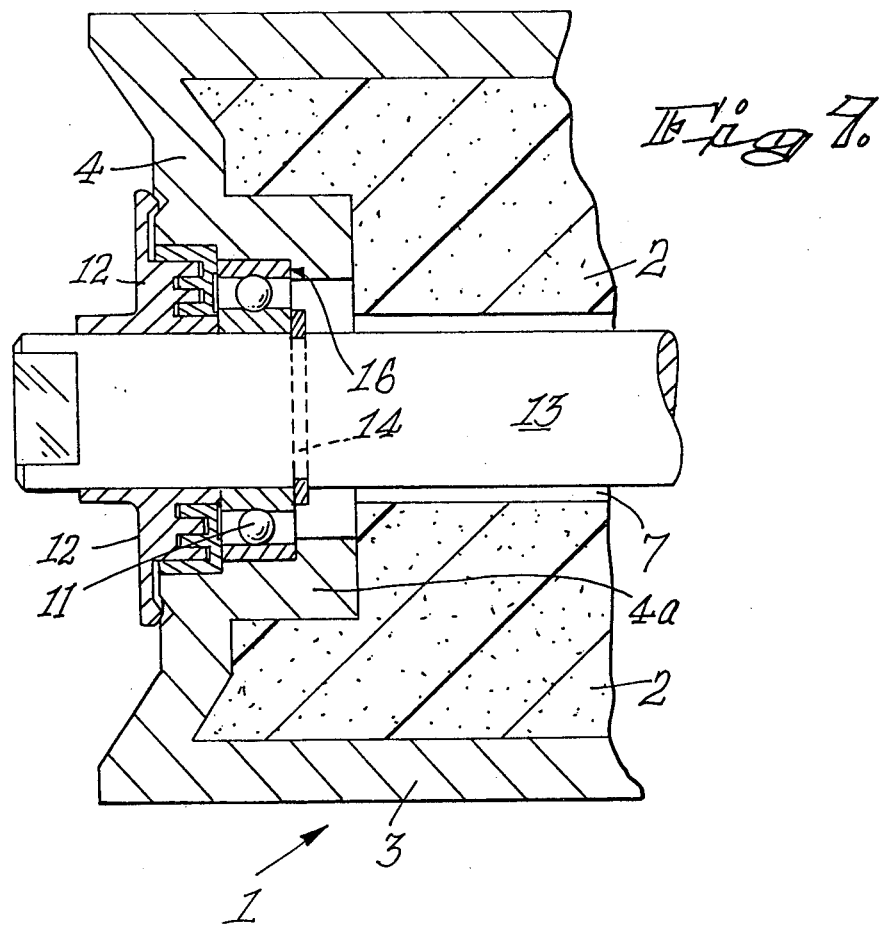

IDLER ROLLER

This invention relates to idler rollers particularly for belt conveyors. Several types of idler rollers are utilised in the conveyor industry including transporting idlers, return idlers and impact idlers. The invention is applicable to all forms of such idlers.

Conventionally idlers for conveyor belt support are constructed of steel or plastic tubular shell material and the ends of the shell are closed by means of separate end plates adapted to carry bearings which are to receive the idler shaft. Tubular shell and end plate constructions have the disadvantage of the requirement for an assembly line and it is difficult to prevent the ingress of particulate matter into the shell during use. Furthermore steel is a relatively costly structural material for this type of component and has various disadvantages such as its tendency to rust or to fuse to the conveyor belt when the conveyor is shut down in cold weather. It would be possible to mould a double walled plastic roller body but the tooling and moulding costs would be excessive.

It has been proposed to machine solid roller bodies from plastic material such as polyethylene and polypropylene but the finished article is even more costly than a conventional steel idler roller body. It has also been proposed to mould a solid body of plastic material having at least the belt engaging surface of foamed material but the load bearing properties of the roller body are not suitable for all types of conveyors. Furthermore the entire roller body, including the inner tubular section where a two part body is employed, is constructed to possess load and wearing resistant properties so that the structure is also relatively costly.

It is an object of the invention to provide an idler roller body of plastic shell material which has useful advantages over steel shell idler rollers as well as plastic rollers of known construction.

According to the invention there is provided an idler roller comprising a prefabricated core having a bore to accommodate an idler shaft, and a shell of synthetic plastic material moulded around the core to provide a tubular load bearing wall and end walls integral therewith, the end walls of the shell each including a cavity in which a bearing for receiving the said shaft is to be mounted.

The tubular load bearing wall of the shell will normally be elongated and the end walls shaped to accommodate roller bearings in suitable cavities which are co-axial with the shaft accommodating bore in the core.

Preferably the core is recessed and the end walls of the shell include tubular zones extending axially into the recesses, the bores of the tubular zones providing the bearing mounting cavities.

Preferably also the end walls of the shell are recessed complementally to the core.

The tubular wall of the shell is a load bearing member the load bearing properties of which are not necessarily assisted by the core. In order to strengthen the shell therefore the core may include a plurality of radial slots therein so that in the moulding of the shell around the core corresponding gussets are formed extending in the slots from the tubular load bearing wall to the tubular zones of the end walls.

The synthetic plastic material used for the formation of the shell may be any hard wearing impact resisting polymer or copolymer composition such as a polyester or polypropylene, but in the preferred embodiments of the invention the shell is formed from a suitable grade of non-foamed polyurethane.

Polyurethanes which are hard wearing and impact resistant are well known to persons skilled in the art and suitable grades for the formation of the non-foamed shell should be selected depending upon the type of idler roller manufactured. Thus for a transportation or return idler selected ratios of polyetherpolyol and polyisocyanate reactants as well as reinforcement materials such as non-woven fibre glass mat, graphite fibres, polyester fibres and the like may be chosen to obtain a shell hardness not less than 80 shore A and preferably at least 100 shore A with an impact resistance for an unnotched sample of not less than $0.6$ ft$\times$lb/inches based on a Charpy test. The moulding composition preferably, but not necessarily, also includes flame retardant and antistatic additives so that the material is self-extinguishing within 5 seconds when subjected to an oxygen, hydrogen welding flame at approximately 1000° C. for 15 seconds.

For an impact roller the polyurethane moulding composition may be modified to have a hardness not less than 40 shore A, preferably 40–60 shore A so that the impact resistance increases and an unnotched sample is unbreakable on a Charpy test. The flammability may be the same as that for a transportation or return idler.

In the preferred embodiment of the invention the polyurethane employed for the formation of the shell is a material in the elastomer range. Such elastomer provides the required properties of impact and wear resistance coupled with suitable load bearing characteristics.

The core in the idler roller of the invention is not required to enhance the load bearing properties of the hard wearing and impact resistant shell. Its function is primarily that of an in situ former to enable the shell to be relatively easily constructed by moulding of a suitable polymer material around the core. A secondary function of the core is that it constitutes a space filler within the load bearing shell.

Thus the core may be prefabricated of any suitable material which is preferably lighter than that of the shell so that the mass of the idler roller is not unnecessarily increased. The core could be a prefabricated wooden element, bonded sand or pulp, a shaped inflated bag or any other desired material, but in preferred embodiments the core is moulded of foamed or expanded polymer material such as expanded polystyrene or preferably foamed polyurethane.

Further according to the invention therefore the core comprises foamed or expanded polymer material and the shell comprises non-foamed polymer material, and in the preferred practical embodiment of the invention the core comprises foamed polyurethane and the shell non-foamed polyurethane.

During the formation of a non-foamed polyurethane shell about a foamed polyurethane core a strong bond between the two polyurethane materials is formed which is desirable in the end product.

The invention includes within its scope a method of manufacturing an idler roller including the steps of mounting a prefabricated annular core within a closed circular cylindrical mould to provide a moulding cavity between the cylindrical surfaces of the core and mould as well as between the ends of the core and the ends of the mould and introducing a suitable settable plastic material into the moulding cavity to form a shell around the core.

When a polyurethane moulding composition is utilised for the formation of the shell a curing period of at least 24 hours is required after demoulding of the idler.

Also according to the invention bearings are suitably positioned within the mould at each end of the core and the shell is moulded over the bearings as well as the core so that the bearings are trapped in position in the moulding operation.

In order to illustrate the invention examples are now described with reference to the accompanying drawings in which:

FIG. 1 is a section through an idler roller according to the invention;

FIG. 2 is a perspective view of an end zone of the core of an idler roller illustrated in FIG. 1;

FIG. 3 is a section of the roller taken on the line III—III in FIG. 1;

FIG. 4 is a section of the roller taken on the line IV—IV in FIG. 1;

FIG. 5 is a section through a portion of the roller of FIG. 1 located in a mould;

FIG. 6 is a view similar to that of FIG. 5 illustrating the moulding of an idler roller according to the invention with bearings in situ; and FIG. 7 is an enlarged section through a portion of the idler roller of FIG. 1 after the idler shaft, bearings and bearing seals have been located in position.

Referring to FIGS. 1 to 4 and 7 of the drawings the idler roller 1 suitable for location on the transportation side of a conveyor (not shown) comprises a preformed annular foamed polyurethane core 2 and a non-foamed polyurethane shell extending over the core and including a load bearing tubular wall 3 and end walls 4 which are integral therewith.

The foamed ployurethane core 2 is formed in a mould so that it has recessed ends 5, radial slots 6 in the recessed ends and a bore 7 extending therethrough.

The shell extending over the core is formed in a mould as will be described hereunder from a hard wearing and impact resistant non-foamed polyurethane elastomer composition to have end walls 4 which include tubular zones 4a extending axially into the recesses of the core, which tubular zones are shaped internally complementally to the core and externally to define a bore with circular rebates 8, 9 and 10 co-axial with the bore of the core for receiving bearings 11 in the rebate 8 and a bearing seal 12 in the rebates 9 and 10. An idler shaft 13 is received within the bore of the core 2 and carries circlips 14 for proper location of the bearings 11 thereon. Idler rollers for belt conveyors are frequently subjected to substantial lateral forces and to prevent shift of the bearings 11 on the shaft 13 circlips 14 should preferably be provided on each side of each bearing.

The shell of the idler has gussets 15 which extend from the tubular wall 3 to the tubular zones 4a of the end walls 4 and serve to strengthen the load bearing properties of the shell.

Referring now to FIG. 5 the idler roller 1 is manufactured by locating the prefabricated core 2 on the supporting rod 20 and mounting the core within a mould comprising a tubular wall 21 and end walls 22 on which the rod 20 is supported so that the core 2 is co-axially disposed in the mould in relation to a moulding cavity defined between the mould walls 21 and 22 and the cylindrical and end walls of the core 2 respectively.

The prefabricated core 2 is itself formed in a mould from a suitable polyurethane foam forming composition in accordance with techniques well known in the art.

The physical properties including that of the density of the core material are not critical since the core is not intended to possess load bearing properties but is intended only to act as an internal former and space filler for the shell of the idler roller. Typically the core is made of a rigid polyurethane foam having a density of 20 to 250 Kg per m$^3$, the shape of the two ends of the core being chosen, as in the case of the core described with reference to FIGS. 1 to 4, so as to permit structural reinforcement of the shell by the shape of the end walls 4 and the formation of gussets 15 when it is moulded about the core.

The core 2 may be formed in its mould on the rod 20 so that the core need merely be transferred from the core mould to the shell forming mould illustrated in FIG. 5. The rod 20 should be coated with a release agent so that after demoulding of the idler roller the rod 20 can easily be withdrawn.

Having located the core 2 co-axially with the shell forming mould the shell is then moulded around the core 2 by introducing a non-foamed polyurethane elastomer forming composition into the moulding cavity around the core via duct 23 so that the shell configuration illustrated in FIGS. 1 to 5 is obtained, the end walls 22 of the mould being profiled as illustrated in FIG. 5 for this purpose.

Prior to introducing the polyurethane elastomer forming composition into the moulding cavity the mould is preheated and its surfaces are coated with a release agent in accordance with standard practice.

The polyurethane elastomer forming composition is selected for the formation of the non-foamed shell of the idler roller to have high abrasion and impact resistance with flame retardant and preferably also anti-static additives incorporated and also, if desired, reinforcement in the form of non-woven fibre glass mat, graphite fibres, polyester fibres or filaments throughout the body of the shell or in selected areas thereof.

Further, if desired, metallic additives or inserts may be used which would serve to prevent build up of static by draining any charge formed via the bearings and the idler roller shaft.

When the shell has cured sufficiently to be self-supporting the roller may be demoulded and left to cure for a further 24 hours, before the shaft 13, bearings 11 and bearing seals 12 are inserted as illustrated in FIG. 7. The non-foamed polyurethane shell bonds intimately with the foamed polyurethane core to provide a roller of relatively inexpensive construction which is impact and abrasion resistant and has the advantage of corrosion resistance, a self-cleaning surface, belt adhesion resistance and bearing protection.

Referring now to FIG. 6 a similar structure to that illustrated in FIG. 5 is provided for the moulding of an idler roller 1a with sealed bearings 11 in situ. For this purpose the structure of the tubular zone of the end walls 4b is modified to dispense with the annular backing shoulders 16 for the bearings 11 of the idler roller 1 by suitable modification of the end walls 32 of the mould illustrated in FIG. 6. For suitable location of the core 2 in the mould annular inserts (not shown) or other supports may be provided between the rod 20 (not shown in FIG. 6) and the wall of the bore 7 of core 2. The sealed bearings are also mounted on the rod 20 which is removed after demoulding of the roller.

The bearings 11 in the idler roller construction of this arrangement are accordingly moulded in position by the end wall portions 4b of the shell formed therearound.

The idler roller constructed as described above has various material advantages over idler rollers of known construction utilised for conveyor belt support. Thus by the utilisation of a prefabricated core which is accurately located in a cylindrical mould, a moulded shell construction is achieved which does not require subsequent machining or substantial assembly line fabrication and is thus relatively inexpensive.

The core of the idler roller is itself constructed of an inexpensive material but which adequately performs its functions as a former about which the load bearing shell is moulded, and a space filler preventing the ingress of abrasive grit and liquids into the shell.

The latter is constructed of polyurethane in the elastomer range and thus has abrasion resistant qualities far in excess of polymer materials of similar cost such as polypropylene and others and, since only a shell and not a solid body is formed, the cost of the materials of construction is maintained at the lowest possible level. The shell is, however, quite capable of withstanding loads placed upon it due to its unitary tubular and end wall construction which can be strengthened by the use of internal gussets or ribs provided by the formation of slots in the core about which the shell is moulded.

We claim:

1. An idler roller, comprising: a prefabricated cylindrical core having a central bore therethrough for accommodating an idler shaft, and an outer cylindrical shell of non-foamed synthetic plastic material separately moulded around the outer cylindrical surface and end faces of the core but not within said central bore to provide a tubular load bearing wall and end walls integral therewith, the end walls of the shell each including a cavity in which a bearing for receiving the said shaft is to be mounted.

2. The idler roller of claim 1 in which each end of the core is recessed and the end walls of the shell include tubular zones extending axially into the recesses, the bores of the tubular zones providing the bearing mounting cavities.

3. The idler roller of claim 2 in which the end walls of the shell are recessed complementally to the core.

4. The idler roller of claim 3 in which each end of the core has a plurality of radial slots therein and the end walls of the shell define gussets extending in the slots from the tubular load bearing wall to the tubular zones of the end walls.

5. The idler roller of any one of the above claims in which the core comprises foamed or expanded polymer material and the shell comprises non-foamed polymer material.

6. The idler roller of claim 5 in which the core comprises foamed polyurethane and the shell non-foamed polyurethane.

7. The idler roller of claim 1 in which the shell comprises a polyurethane material in the elastomer range.

8. The idler roller of claim 1 in which the shell is moulded around the core and around the outer peripheries of bearings located at the ends of the core.

9. A method of manufacturing an idler roller, including the steps of: mounting a prefabricated annular core having a central bore therethrough within a closed circular cylindrical mould to provide a moulding cavity between the cylindrical surfaces of the core and mould as well as between the ends of the core and the ends of the mould but to isolate said central bore, and introducing a suitable settable plastic material into the moulding cavity to form a non-foamed, load bearing shell around the outer cylindrical surface and end faces of the core but not within said central bore.

10. The method of claim 9 wherein roller bearings are suitably positioned within the mould at each end of the core and in abutment therewith, and the shell is moulded around the outer peripheries of the bearings as well as over the core so that the bearings are trapped in position in the moulding operation.

* * * * *